United States Patent [19]

Adler

[11] 4,154,338
[45] May 15, 1979

[54] PACKAGE FOR INFORMATION CARRIERS

[75] Inventor: Ulrich Adler, Korntal, Fed. Rep. of Germany

[73] Assignee: Robert Bosch GmbH, Stuttgart, Fed. Rep. of Germany

[21] Appl. No.: 901,647

[22] Filed: May 1, 1978

[30] Foreign Application Priority Data

May 11, 1977 [DE] Fed. Rep. of Germany ....... 2721160

[51] Int. Cl.² ...................... B65D 85/56; B65D 83/04; B65D 79/00
[52] U.S. Cl. .................................... 206/232; 206/387
[58] Field of Search ................. 206/232, 45.14, 45.34, 206/387, 490, 523, 588, 562, 564

[56] References Cited

U.S. PATENT DOCUMENTS

| 3,583,729 | 6/1971 | De Groot | 206/232 |
| 3,586,349 | 6/1971 | Green | 206/232 |
| 3,604,556 | 9/1971 | Schwartz | 206/45.34 |
| 3,641,684 | 2/1972 | Paige | 206/232 |
| 3,777,881 | 9/1971 | Schwartz | 206/387 |
| 3,865,237 | 2/1975 | Isaacs | 206/387 |
| 3,866,751 | 2/1975 | Holert | 206/387 |
| 3,958,690 | 5/1976 | Gee, Sr. | 206/232 |

FOREIGN PATENT DOCUMENTS

| 2426001 | 12/1975 | Fed. Rep. of Germany | 206/387 |
| 2451347 | 5/1976 | Fed. Rep. of Germany | 206/387 |

*Primary Examiner*—George T. Hall
*Attorney, Agent, or Firm*—Flynn & Frishauf

[57] ABSTRACT

To permit visible inspection of the package contents and also insertion of an information or advertising leaflet, a block or plate-like carrier body with a flat surface is formed with a recess in which the tape cassette or cartridge is placed, leaving a substantial surface area around the cassette, the information or advertising leaflet being shaped to fit the remaining surface area, leaving the cassette itself uncovered. A transparent cover is placed over the assembly, with the edge of the cassette or cartridge exposed for visual inspection.

7 Claims, 1 Drawing Figure

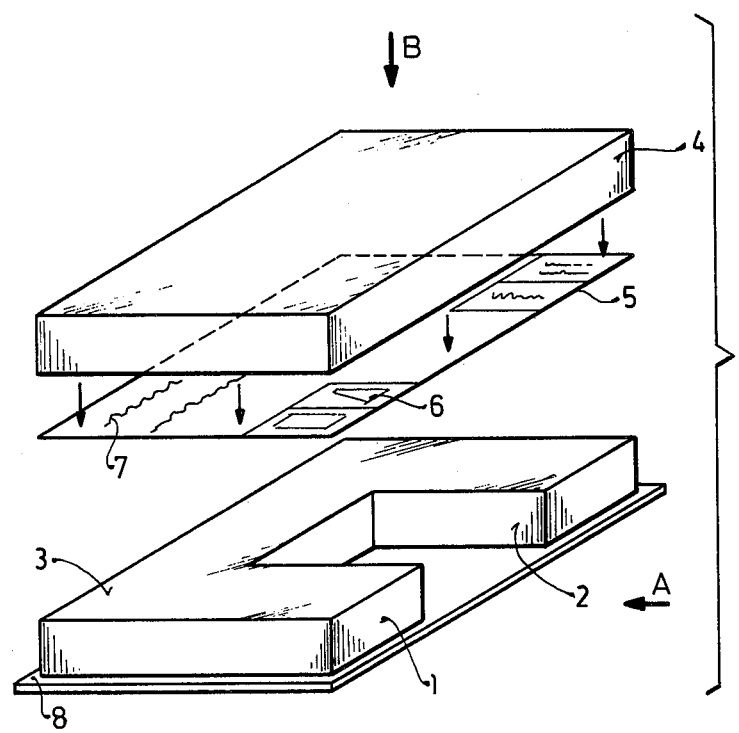

PACKAGE FOR INFORMATION CARRIERS

PRIOR PUBLICATIONS

U.S. Pat. No. 4,004,689
U.S. Pat. No. 3,866,751
DGM No. 74 18 574

The present invention relates to a package structure, and more particularly to a package structure for an information carrier such as a magnetic tape cassette or cartridge.

BACKGROUND AND PRIOR ART

It has previously been proposed to package magnetic tape cassettes or cartridges in plastic cases which usually are transparent and which are formed in the shape of a receptacle for the cartridge. If information sheets, advertising leaflets, and the like, are to be inserted in such a receptacle, the information leaflet will tend to entirely obscure the contents within the package. It is also known to package goods in plastic containers which are formed with recesses corresponding to the shape of the goods to be packaged, either for shipment or for display. A transparent cover can be placed thereover. Such packages have the disadvantage that they are not suited to the reception of advertising or information leaflets, and that the contents of the assembled package cannot be readily inspected from two directions; plastic molded recess-type packages also are difficult to stack.

THE INVENTION

It is an object to provide a package structure which is simple, permits the insertion of advertising sheets or leaflets, and which results in a final package which can be easily stacked.

Briefly, a block-like or plate-like carrier body, for example of plastic, is formed with a recess in a surface thereof which, preferably, is a flat surface. The recess matches the outer dimensions of the information carrier, typically a magnetic cassette or cartridge. A transparent cover fits over the entire body, that is, over the surface as well as over the recess. An information insert sheet is located between the surface and the cover, preferably shaped with a cut-out leaving exposed at least a portion of the information carrier within the recess. The recess is preferably located at an edge of the block or plate-like carrier so that both the top side as well as an edge of the information carrier, for example a cassette or cartridge, will be visible.

The package permits simple insertion of advertising instruction or other information leaflets; the package is easily assembled and can be readily stacked. Additionally, the package lends itself admirably to mailing.

Visibility of the contents, when placed within the package, has the advantage that even in stacks of such packages, the individual contents therein can be easily recognized and inspected. The general outline, in top projection, of the overall package can be determined essentially by the dimensions of the advertising or information or advertising insert sheet; the height of the package can be determined, essentially, by the thickness of the information carrier itself, that is, typically the cassette or cartridge.

Drawings, illustrating a preferred example:

The single FIGURE is an exploded view of a packaging structure with an information insert leaf.

A packaging base or carrier 1, for example made of plastic, such as foamed plastic, is formed with a recess 2 extending from one edge. The FIGURE shows a package for a magnetic tape cartridge. The cartridge can be inserted from one edge into the recess 2; one end surface of the cartridge will then be visible. The body 1 is, preferably, formed with a bottom flange or bottom plate-like extension as is clearly visible in the FIGURE. Other information carriers than magnetic tape units may be packaged this way, for example books, brochures, magazines, or the like. The recess 2 is of such depth and dimension that the edge of the article to be packaged essentially matches the edge of the body 1 adjacent the recess. Upon placement of a transparent cover 4 over the package, with the information carrier article inserted in the recess 2, it is then possible to view the contents of the package both from the side, that is, direction of the arrow A, as well as from the top, that is, direction of the arrow B. The body or block 1 is formed with a top surface 3 on which an information, advertising or instruction leaflet 5 is placed. Preferably, at least a portion of the article in the recess 2 should be left exposed. The leaflet 5 can be printed with micro images 6, and with printed information or instructions for use, as schematically indicated at 7.

The top cover 4, preferably of transparent plastic material, fits over body 1 and against the bottom plate or surface beneath the body 1. The result is a compact package which can be easily stacked, can readily be made secure for mailing, while still permitting inspection of the contents through the cover, from the edge, and also from the bottom, if the bottom surface plate 8 is also transparent.

The recess 2 need not be located centrally as shown; it can also be located at a corner so that the body 1 then will not be generally C-shaped but, rather, will generally L-shaped. It is then possible to recognize the contents from the top, from the front edge, from a side edge and, if the bottom edge is transparent, also from the bottom.

Various changes and modifications may be made within the scope of the inventive concept.

I claim:

1. Package for information carriers, particularly magnetic tape cassettes, cartridges and the like, comprising,
   a block or plate-like base structure having an essentially flat top surface (3) and a recess (2) in said surface matching the outer dimensions of the information carrier to be packaged;
   an information insert sheet (5) placed above said surface (3) and having an outline matching approximately said surface less said recess and dimensioned, in plan view, to match the outline of said flat top surface;
   the recess being positioned within said block or plate-carrier and dimensioned and positioned such that an edge of the information carrier matches approximately at least one edge of said block or plate-like carrier structure (1);
   the thickness of said block or plate-like carrier structure being dimensioned to match approximately the thickness of the information carrier to be packaged;
   and a transparent cover (4) fitting over said surface, covering the recess, and having marginal portions fitting over the block - or plate-like carrier base structure (1) over essentially its entire thickness to permit inspection of said information insert sheet (5) on said surface (3) and of said information carrier through said cover from the top and from the edge.

2. Package according to claim 1, wherein said insert sheet (5) includes micro film pictures (6).

3. Package according to claim 1, wherein said block or plate-like carrier structure (1) and said cover (4) are made of plastic material.

4. Package according to claim 1, wherein the block or plate-like structure includes a bottom plate element (8) which is transparent at least in part in the region beneath said recess (2).

5. Package according to claim 4, wherein said cover is plastic material and fits against said bottom plate (8).

6. Package according to claim 1, wherein said block on plate-like carrier base structure comprises foam plastic forming a shock-absorbing body for said information carrier when the cover is fitted thereover and engaging said information carrier around three sides thereof interiorly of the cover.

7. Package according to claim 6, wherein the block or plate-like structure includes a bottom plate element (8) which is transparent at least in part in the region beneath said recess (2), and said cover (4) is plastic material fitting against said bottom plate (8).

* * * * *